Figure 8:
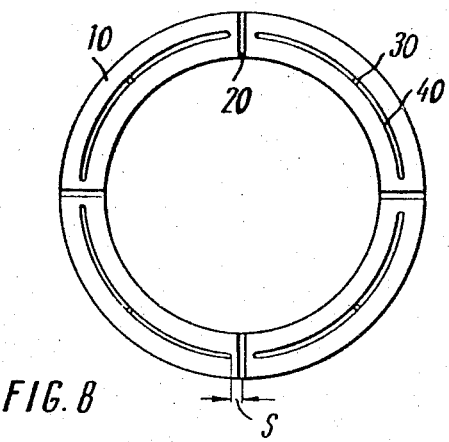

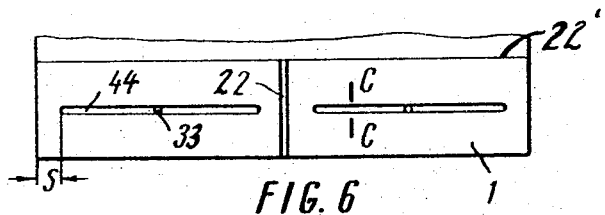
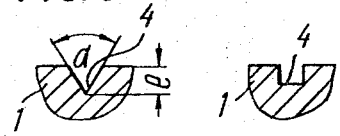
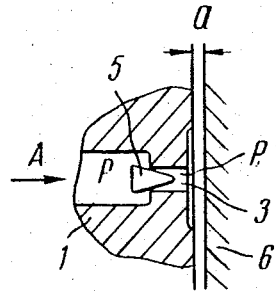
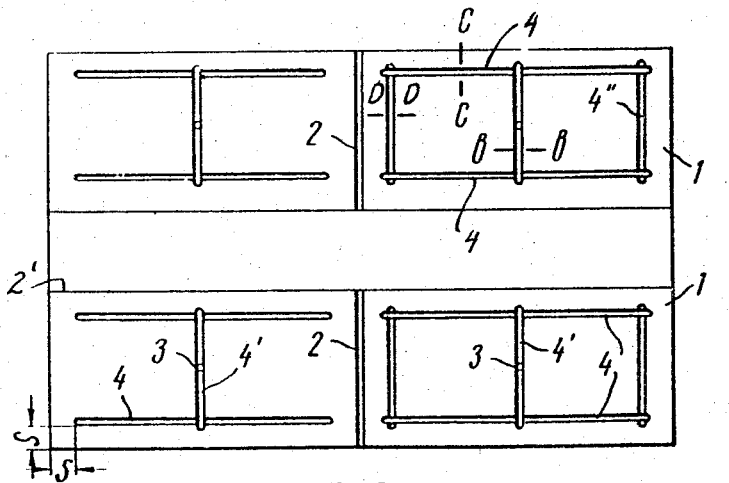
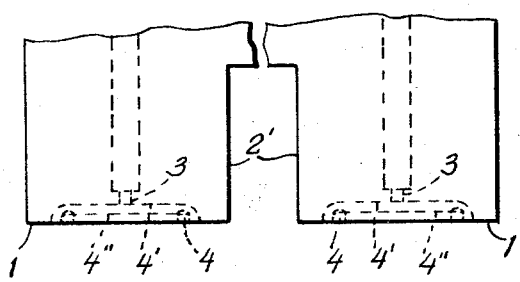

United States Patent Office 3,318,557
Patented May 9, 1967

3,318,557
AEROSTATIC SUPPORT FOR MACHINES
AND APPARATUS
Viktor Petrovich Zhed, Uchebny pereulok 2, kv. 57; Solomon Aizikovich Sheinberg, Rostovskaya naberezhnaya 3, kv. 46; and Maria Andreevna Pavlova, 5 Verkhne-Mikhailovsky proezd 28, kv. 61, all of Moscow, U.S.S.R.
Filed July 12, 1965, Ser. No. 471,134
4 Claims. (Cl. 248—20)

This invention relates to aerostatic supports for machines and apparatus in which the mating surfaces of the moving parts are separated by a cushion formed by a layer of gas being fed under pressure.

In the known aerostatic supports, the mating surfaces of the moving parts are separated by a layer of gas being fed under pressure through the holes provided in one of the mating surfaces. The diameter of these holes is very small, being in the range of 0.2 to 0.4 mm., while the number thereof, depending upon the overall area of the mating surfaces, may be as large as several dozen. In this case each hole is essentially a throttle whose live bore must be accurately calculated and machined, in order to ensure uniformity and stiffness of the gas layer.

However, the machining of a large number of such holes presents considerable processing difficulties. Likewise, in the course of operation, the small-diameter holes are likely to become clogged, which impairs the proper functioning of the aerostatic support, thus resulting in the misalignment of the mating surfaces and a deterioration of the stiffness of the gas cushion as a whole.

Moreover, when the gas is being fed through small-size holes, the phenomenon known as "sticking" occurs, consisting in that the thickness of the gas cushion decreases, resulting in the deterioration of the lifting capacity thereof. This being the case, the gas-feed holes become closed by the surface of the mating part, so that the high-pressure zone is restricted to the areas of the holes proper.

At present, to eliminate this drawback, minor circular dents are made around the outlet of the gas-feed holes, the diameter of these dents being somewhat larger than that of the hole proper. However, this involves the danger of vibration, because large quantities of gas accumulated in the dents begin acting as air springs.

The main object of this invention is to develop such an aerostatic support for machines and apparatus which would ensure high vibration-resisting characteristic of the gas cushion separating the surfaces of the mating parts.

A further object of the invention is to develop such an aerostatic support for machines and apparatus which would feature adequate stiffness of the gas cushion.

Another object of the invention consists in developing such an aerostatic support for machines and apparatus which would provide for ready control of the thickness of the gas cushion.

One more important object of the invention is to develop such an aerostatic support for machines and apparatus which would be simple to manufacture.

In accordance with the above-specified and other objects, in the aerostatic support proposed herein, the working surface of the part provided with the gas-feed holes is subdivided by the passageways communicating with the atmosphere into, at least, three sections, each of these having distributing passageways for the gas being charged through said gas-feed holes.

Said holes intended for feeding gas under pressure are equipped with throttles, while the gas-distributing passageways of each section have the shape of microgrooves located on the working surface of the machine part.

By virtue of these novel features, the design of the aerostatic support covered by this invention ensures simplicity of said aerostatic support, stiffness and high vibration-resisting characteristic of the gas cushion, and ready control of the thickness thereof.

Figure 7:
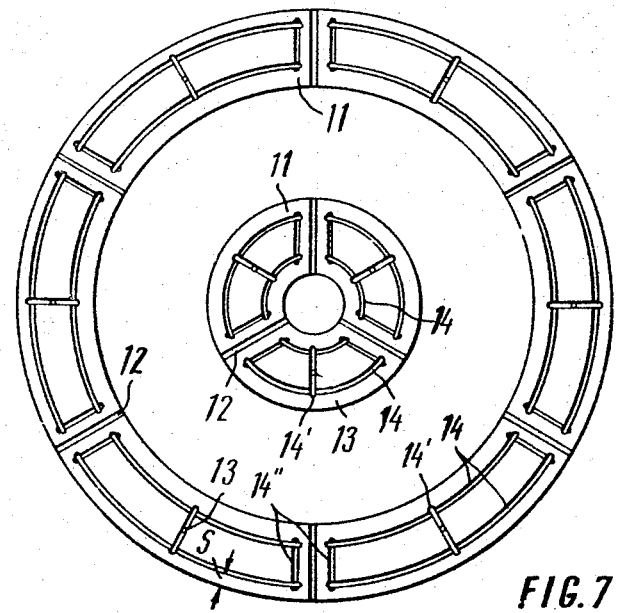

In order that the invention may be readily carried out into effect, an embodiment thereof will now be described by way of example with reference to the accompanying diagrammatic drawings, wherein:

FIGURE 1 is a plan view of the under surface of a load-carrying member or carriage illustrating spaced mating surfaces embodying the invention for cooperation with spaced guides, as viewed from below, FIGURE 1a is an end elevational view of the arrangement of FIGURE 1 broken away for purposes of clarity, with the structure of FIGURE 1 shown inverted and as viewed from the right, FIGURE 2 is a fragmentary cross-sectional view illustrating the gas-feeding hole equipped with a throttle, FIGURES 3 to 5 are fragmentary cross-sectional views illustrating different microgroove cross-sectional patterns, FIGURE 6 is a fragmentary view similar to FIGURE 1 but illustrating a modified arrangement in which the surfaces for cooperation with the guides are reduced in width, FIGURE 7 is a view similar to FIGURE 1 but illustrating the lower surface of a turntable arrangement and in which the surfaces embodying the invention are wide, and FIGURE 8 is a view of the under surface of another turntable arrangement embodying the invention and in which the surfaces intended to cooperate with the guide are reduced in width.

The example of the embodiment of the invention described herein is an aerostatic support of a carriage or load-carrying member. The mating surfaces of the carriage and the base frame are separated by the cushion formed by a layer of gas being fed under pressure.

Mating (i.e., working) surface 1 of the carriage is divided by open channels 2 communicating with the atmosphere, into four sections, i.e., two sections per each guide separated by channel 2′, see FIGURE 1a. Hereinafter the channels 2, 2′ and 22′ and the similar channels in the other figures are termed gas-bleed passageways.

The mating surface with the holes can be divided into any number of sections, but not less than three sections, taking in consideration that the position of a plane in space is determined by three points.

Each section, see FIGURE 1, comprises one hole 3 intended for feeding gas under pressure, and distributing passageways for gas feeding, said passageways having the shape of microgrooves 4′ and 4, the former communicating with holes 3. The microgrooves mentioned above replace a large number of small-size holes.

The inlet of each hole 3 is provided with a throttle 5 (FIGURE 2) intended for controlling the thickness $a$ of the gas cushion formed between working surface 1 and guides 6 of the base frame.

Channels 2 prevent gas by-pass from one section to the other, which ensures constant stiffness of the gas cushion in each of the sections.

The gas being fed under pressure in the direction of arrow A (FIGURE 2) flows, past throttle 5 through hole 3, and is distributed through microgrooves 4′, 4 and 4″. As a result, a gas cushion is provided, which separates mating surfaces 1 of the carriage spaced by channel 2′ and of guides 6 of the base frame, the gas pressure in the zone restricted by the microgrooves being higher than that in the other zones. Outside the zone restricted by microgrooves 4, the pressure of the gas cushion is gradually decreasing, until it equals ambient pressure.

The gas pressure along microgrooves 4 gradually decreases, depending upon their distance from throttle 5. The necessary stiffness and vibration-resistance of the gas cushion is ensured by the selection of the appropriate microgroove cross-section.

The distributing passageways for gas feeding can have the shape illustrated in FIGURES 1, 6, 7 and 8, the selection of the shape depending upon the width of the sections.

When the width of the section is more than 40 mm., the preferable pattern of the gas feed passageways is as follows.

For rectilinear guides, in the center of each section hole 3 is provided (FIGURE 1) through which transverse microgroove 4' is cut, said microgroove being arranged perpendicular to the guide (i.e., to the length of the section). Gas-bleed channels 2 are arranged also perpendicular to the length of the guide.

Spaced at a distance S which shall be not less than 15 mm. from the section edges are microgrooves 4 arranged parallel to the edges of the section, the cross-sectional area of said microgrooves gradually decreasing in the direction away from holes 3.

The microgrooves may form a closed contour, for the shorter sections, or may have an open contour, in the shape of the letter H, for the longer sections, see the left-hand side of FIGURE 1.

Disposed at a distance S which shall be not less than 15 mm. from the section edges are microgrooves 4 arranged concentrically with the edges of the section, the cross-section area of said microgrooves gradually decreasing in the direction away from hole 3.

In this case, the microgrooves may form a closed contour, for the shorter sections, closing microgrooves 4" being arranged parallel to gas-bleed passageways 2, or may form an open contour, in the shape of the letter H, for the longer sections.

When the length of the section is less than 40 mm., the preferable pattern of the gas feed passageways is as follows.

Hole 33, FIGURE 6, located in the center of the section communicates with microgroove 44. For the rectilinear guides, as spaced by channel 22' and subdivided by channel 22 said microgroove shall be arranged parallel to the longer edge of the section, while for the circular guides, it shall be located concentric with the edges of the section (FIGURE 8).

FIGURES 7 and 8 respectively illustrate what can be termed the bottom surface of turntable arrangements. FIGURE 7 is one in which the surface beneath which the air cushion is formed is considered a wide surface and, as shown, a plurality of radial channels 12 subdivide the surfaces into segmental sections. In each section there is a gas-feed hole 13 communicating with radial microgroove 14'. This microgroove is, of course, a channel having closed ends and it communicates with each of arcuate microgrooves 14. The opposite ends of each of the arcuate microgrooves 14 communicate with radial microgrooves or passageways 14".

In FIGURE 8 the turntable has what is termed narrow surfaces and the channels 20 subdivide the surface into four segments 10 in each of which is provided an arcuate passageway formed by microgroove 40 and through the structure extends the gas-feeding hole 3 which communicates with microgrooves 40.

Experiments have proved that the distance S (FIGURES 1, 6, 7 and 8) shall be not less than 15 mm., because otherwise, in order to ensure the required carrying capacity of the aerostatic support, a higher rate of gas flow would be necessary.

In the example given herein, the total area of working surface 1 of the carriage amounts to 800 cm.$^2$, and the air feed pressure is 3 atm. gauge. The diameter of air feed hole 3 is 2 mm. The thickness $a$ of the air cushion is 0.01 mm. The mating surfaces have been subjected to scraping, the roughness value thereof being within the 0.01 mm. limit.

In order to ensure maximum carrying capacity and stiffness of the gas cushion, the following relation of gas pressure after the throttle ($P_1$) and before the throttle ($P$) shall be obtained:

$$\frac{P_1}{P} \cong \frac{2}{3}$$

The shape of the cross-section of microgrooves 4 may be semi-circular, rectangular and triangular, as can be seen from FIGURES 3, 4 and 5. The preferable profile of the microgroove is V-shaped in cross-section as shown in FIGURE 3.

The optimum dimensions of the microgrooves in the B—B section (FIGURES 1 and 3) are as follows: angle $\alpha = 60°$, and microgroove depth $e = 0.65$ mm.; in the C—C section: angle $\alpha = 60°$ and microgroove depth $e = 0.5$ mm.; in the D—D section: angle $\alpha = 60°$, and microgroove depth $e = 0.3$ mm. The lifting capacity of the gas cushion is 800 kg. Air consumption is 6 m.$^3$/hr. (at atmospheric pressure).

It is therefore clear that the present invention provides an aerostatic support for machines and the like which comprises a load-carrying member having a substantially flat under surface as shown at 1 in FIGURE 1. The under surface is adapted to be disposed in facing relation to a base surface fragmentarily illustrated at 6 in FIGURE 2. The under surface has open channels therein, such as 2 and 2', the opposite ends of which communicate with atmosphere and which divide the under surface into at least three sections separated by the channels, there being four sections in FIGURES 1 and 8, six sections in the outer ring of FIGURE 7, and three sections in the inner ring. There are a plurality of grooves provided in the under surface which define downwardly open passageways having closed ends. Further, the member has a plurality of pressurized gas-feeding holes extending therethrough with each hole being in respective communication with a passageway for conducting pressurized gas into the passageways so as to provide a pressurized supporting gas cushion between the load-carrying member. Furthermore, there is at least one passageway and associated hole related with each separate section, see FIGURES 6 and 8, with reference to surfaces that are narrow.

Where the surface of each section that is to have an air cushion therebeneath is considered a wide surface, see FIGURES 1 and 7, the passageways which are microgrooves comprise a plurality of passageways in each section. This plurality in each section comprises a first pair of mutually spaced passageways such as 4" in FIGURE 1 and 14" in FIGURE 7, that are of equal depth. There is a second pair of mutually spaced passageways 4 in FIGURE 1 and 14 in FIGURE 7, extending transversely of the passageways of the first pair, of greater depth than such passageways and each passageway 4 and 14 of the second pair communicating with each of the passageways 4" and 14" of the first pair. Further, there is an additional passageway 4 and 14' extending transversely of the passageways 4 and 14 of the second pair, located intermediate the passageways 4" and 14" of the first pair and having greater depth than the passageways 4 and 14 of the second pair. The passageways 4' and 14' communicate with both of the passageways 4 and 14 of the second pair and the gas-feeding hole 3 and 13 communicates with this additional passageway 4' and 14'.

What we claim is:

1. An aerostatic support for machines and the like comprising a load-carrying member having a substantially flat under surface adapted to be disposed in facing relation to a base surface, said under surface having open channels therein the opposite ends of each of which communicate with atmosphere and which open channels divide said under surface into at least three sections each separated by a channel, said under surface having a plurality of grooves therein defining downwardly open passageways having closed ends, said member having a plurality of pressurized gas-feeding holes extending therethrough with each in respective communication with a passageway for conducting pressurized gas into the passageways, so as to provide a pressurized supporting gas cushion beneath said member and there being at least one passageway and associated hole related with each separate section.

2. An aerostatic support for machines as claimed in claim 1 in which said passageways are microgrooves.

3. An aerostatic support for machines as claimed in claim 1 in which there are a plurality of passageways in each section, said plurality of passageways in each section comprising a first pair of mutually spaced passageways of equal depth, a second pair of mutually spaced passageways extending transversely of the passageways of the first pair, of greater depth than the depth of the passageways of the first pair and each passageway of the second pair communicating with each of the passageways of the first pair, and an additional passageway extending transversely of the passageways of the second pair, located intermediate the passageways of the first pair, having greater depth than the passageways of the second pair communicating with both passageways of the second pair, and said hole communicating with said additional passageway.

4. An aerostatic support for machines as claimed in claim 3 in which all said passageways are of V-shape in cross section.

References Cited by the Examiner

UNITED STATES PATENTS

| 2,938,590 | 5/1960 | Barnett | 180—7 |
| 3,097,718 | 7/1963 | Jay et al. | 180—7 |
| 3,239,024 | 3/1966 | Christian | 180—7 |
| 3,247,921 | 4/1966 | Latimer-Needham et al. | 180—7 |

CLAUDE A. LE ROY, *Primary Examiner.*

JOHN PETO, *Examiner.*